July 27, 1948.　　　　R. T. SAWYER　　　　2,445,973
ROTARY ENGINE POWER PLANT
Filed April 13, 1944
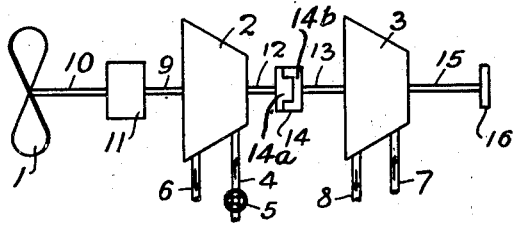
– FIG. 1. –
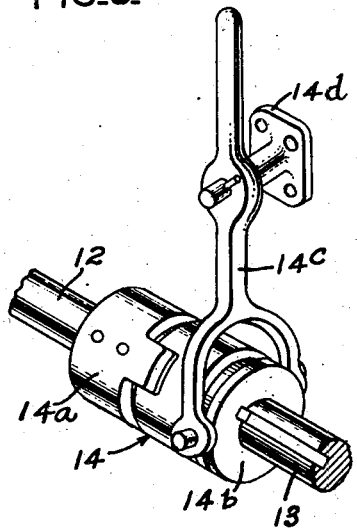
– FIG. 5. –
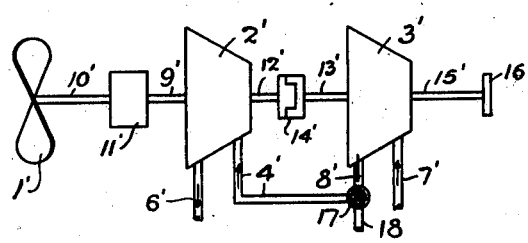
– FIG. 2. –
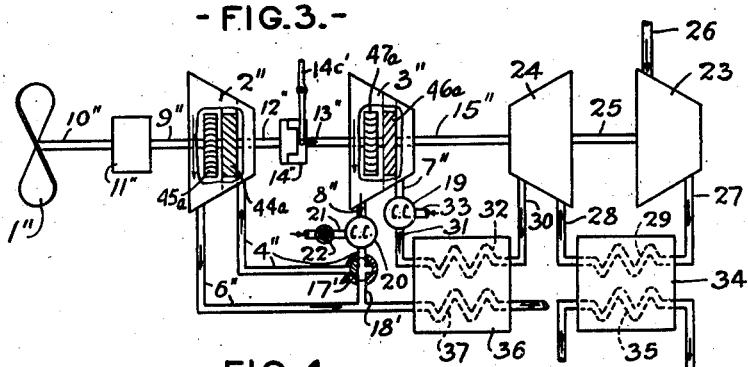
– FIG. 3. –
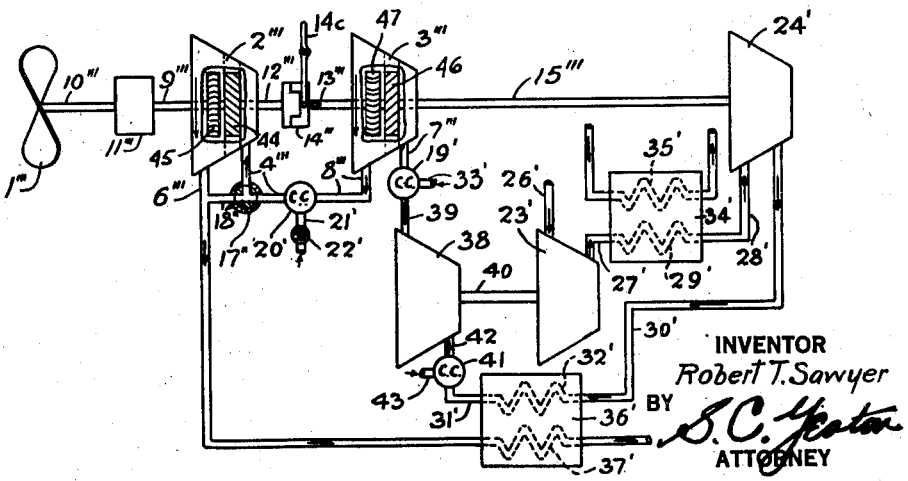
– FIG. 4. –
INVENTOR
Robert T. Sawyer
BY
S. C. Yeaton
ATTORNEY Patented July 27, 1948

2,445,973

UNITED STATES PATENT OFFICE 2,445,973

ROTARY ENGINE POWER PLANT

Robert T. Sawyer, Hohokus, N. J., assignor to American Locomotive Company, New York, N. Y., a corporation of New York Application April 13, 1944, Serial No. 530,859

5 Claims. (Cl. 60—41)

This invention relates to a rotary engine power plant in which a rotatable load is employed which is intended for rotation in either direction as occasion requires, as for instance a propeller of a ship.

An object of the invention, in its broad aspect, is to provide a power plant including a load characterized as aforesaid for reversal of rotation, a rotary engine for rotating the load in one direction and another rotary engine for rotating the load in the reverse direction, one of the engines rotating the load through the other engine, which other engine, during this period of load rotation, is idling and is rotating in a reverse direction to that when it is rotating the load.

Other and further objects of this invention will appear from the following description, the accompanying drawing and the appended claims.

Referring to the drawing forming a part of this application which shows schematically four embodiments of the invention, Figure 1 is a front elevation of a power plant embodying the present invention, the various pipe connections being broken off, the engines being rotated each by separate power fluid; Fig. 2 is a view similar to Fig. 1 except that the power fluid leaving one engine enters the other engine for rotating same; Fig. 3 is a view similar to Fig. 2, but other elements are added including a rotatable air compressor; Fig. 4 is a view similar to Fig. 3, but other elements are added including another rotatable engine; and Fig. 5 is an enlarged perspective view of a portion of the power plant of Fig. 1 showing a clutch device in partly open position.

The power plant of the present invention comprises, in its broad aspect, a rotatable engine connected to the load for rotating it in one direction, and another rotatable engine for rotating the load in the opposite direction. The first engine, when driving, rotates in a reverse direction to the second engine, the engines being connected by means including a clutch device or the equivalent, openable to disconnect the engines and closable to connect the engines whereby the second engine rotates the load, through the first engine, in a reverse direction. The first engine, during this period of load rotation, idles and also rotates in a reverse direction. The second engine also rotates another rotatable load, as for instance a rotatable air compressor.

The power plant of the present invention may involve any one of various suitable rotatable loads but as the invention lends itself particularly to a power plant involving a ship propeller, the various views show such a propeller and, for brevity, the description will be confined thereto.

In the various embodiments similar parts are indicated by similar reference numerals with distinguishing accents added, and the direction of flow of the power fluid in the various embodiments is indicated by arrows.

Referring to the embodiment of Fig. 1, the power plant comprises a propeller 1, a first rotary engine 2, and a second rotary engine 3. Engines 2 and 3 may be, for example, turbines similar to the corresponding turbines of Fig. 4, later to be described. These engines are propelled by separate power fluid, that is to say engine 2 does not receive, as power fluid, the exhaust from engine 3. Engine 2 has a power fluid supply pipe 4, leading to its inlet controlled by a valve 5, and an exhaust pipe 6 leading from its outlet. Engine 3 has a power fluid supply pipe 7 leading to its inlet and an exhaust pipe 8 leading from its outlet. Engine 2 is connected to propeller 1 by shafts 9 and 10 and a train of gears 11 for providing the desired speed for the propeller 1. The gears may not be necessary in all instances.

The engine 2 is connected to engine 3 by shafts 12 and 13 and intervening clutch device 14 or like device. In the various embodiments of the present invention, the means for coupling and uncoupling the shafts is preferably a well-known type of clutch device shown in detail in Fig. 5 in partly open position, which is of the type employed in the Slattery Patent 1,107,717, see Fig. 1 thereof, and shown symbolically in Figs. 1 to 4 in the instant case. Referring more particularly to Figs. 1 and 5, the clutch device 14 is operated in the usual manner to open and close it, opening it when the engine 2 is to rotate the propeller 1 in one direction, and closing it when the engine 3 is to rotate the propeller in the reverse direction.

The clutch device 14 includes the jaws 14a and 14b. The jaw 14a is fixedly secured on the shaft 12 and the jaw 14b is splined to the shaft 13 to be slid thereon when operating the clutch device. The jaws rotate with their respective shafts. The jaw 14b is manipulated, to open and close the clutch device, by a lever 14c, fulcrumed on a bracket 14d which will be secured to any suitable stationary support. The engine 3 has a shaft 15 which terminates in a collar 16 for connection to a rotatable load (not shown) which will be rotated by the engine 3 when the engine 3 is rotating the propeller 1 and also when engine 3 is not rotating propeller 1.

The operation of the power plant of Fig. 1 is as follows: Engine 3, in practice, is provided with a load at the collar 16 and it will rotate this load in the manner aforesaid and in one direction only, namely in a reverse direction to the direction of rotation of engine 2 when engine 2 is rotating the propeller 1. When clutch device 14 is open engine 2 will rotate propeller 1 in a predetermined direction, engine 2, during this period, rotating oppositely to the direction of rotation of engine 3. When the clutch device 14 is closed engine 3 will rotate the propeller but in the opposite direction and through engine 2, and engine 2 will also be reversed in direction. During this period valve 5 is closed so that engine 2 idles.

Referring to the embodiment of Fig. 2, the power plant is similar to that of Fig. 1 except that the engine 2' receives its power fluid from the exhaust of engine 3'. To this end pipe 4' is connected to pipe 8' and, instead of valve 5, valve means is provided for controlling pipes 4' and 8'. Preferably a two-way valve 17 is employed, conveniently disposed at the junction of pipe 4' and pipe 8', the valve being provided with an exhaust pipe 18. Valve 17 is similar in construction to a corresponding valve shown in Fig. 4, later to be described. Also engines 2' and 3' may be turbines similar to the corresponding turbines of Fig. 4, as aforementioned.

The operation of this power plant is similar to that of Fig. 1 except that the two-way valve 17 is manipulated so that when engine 2' is rotating the propeller 1' the valve 17 opens pipe 8' to pipe 4', and closes it to exhaust pipe 18 for supply of exhaust from engine 3' to engine 2'. When engine 3' is rotating the propeller the valve 17 is manipulated to close pipe 8' from pipe 4' and to open it to exhaust pipe 18.

Referring to the embodiment of Fig. 3, the power plant is similar to that of Fig. 2 except that various features are added, the engines being, in this embodiment, hot elastic fluid turbines, similar to the aforementioned turbines of Fig. 4, and they will be so considered hereafter. The fluid will usually be hot air under pressure or hot air and products of combustion under pressure, and will be hereafter designated as hot gas, for convenience. The turbine 3" is supplied with hot gas by pipe 7" for rotating it, and this hot gas leaves turbine 3" and is led through pipes 8" and 4" to turbine 2" for rotating it.

While in describing Figs. 1 and 2 the broad term "rotary engines" is employed it is obvious that the engines, if desired, may be hot gas turbines, and in such case the embodiment of Fig. 2 would in no way differ from the embodiment of Fig. 3 as thus far described. However in the embodiment of Fig. 3 a combustion chamber 19 is employed for adding heat and products of combustion to the power gas for turbine 3" and is connected at its outlet to the pipe 7".

This construction of turbines with their associated parts, as thus far described, presents an operative unit. This unit is shown as having a second combustion chamber 20 receiving at its inlet exhaust from the turbine 3" through pipe 8" and at its outlet being connected to the pipe 4" for supplying turbine 2" with the reheated exhaust and additional products of combustion. The two-way valve 17' is interposed in the pipe 4" and provided with the exhaust pipe 18', later further referred to. Chamber 20 may be given a heating capacity relative to that of the chamber 19 so that the pressure rotating turbine 2" may be equal to or even greater than the pressure rotating turbine 3".

While Fig. 3 is diagrammatic, the stationary and rotary parts of the turbines 2" and 3" are indicated and the control valve 17' for the turbine 2" is shown in cross section so that the reversing of the power plant can be more clearly understood. Turbine 2" has stationary blades 44a directing the gas entering the turbine from duct 4" in a proper manner so that it will rotate the turbine rotor 45a in the proper direction for driving the propeller 1" in a forward direction when gas is flowing through the duct 4". Turbine 3" has stationary blades 46a directed oppositely from the stationary blades 44a of turbine 2", and the rotor 47a of turbine 3" has blades which are oppositely directed from the blades of rotor 45a so that gas entering turbine 3" from duct 7" rotates rotor 47a in the opposite direction from rotation of rotor 45a when rotor 45a is being driven by its gas. The direction of rotation of rotor 47a is always the same and is indicated by an arrow. In Fig. 3, the clutch device 14" is shown closed. In other words propeller 1" and turbine 2" are being driven by turbine 3". Thus at this time rotor 45a will be rotating in the direction indicated by the arrow, that is, in the same direction as rotor 47a. Thus turbine 2" will not be provided with any gas and duct 4" will be closed by valve 17' as indicated in Fig. 3, valve 17' connecting pipe 8" with the pipe 6". Combustion chamber 20 will be inoperative since its supply of fuel will be closed off by valve 22.

The propeller 1" as aforesaid will be running in reverse when the power plant is adjusted as shown in Fig. 3. If it is desired to drive the propeller 1" in a forward direction, then clutch 14" will be opened by means of its lever 14c', valve 17' will be turned to connect ducts 8" and 4", and valve 22 will be opened to supply fuel to the combustion chamber 20. Rotor 47a will then run in the same direction, that is, in the direction of the arrow shown, but rotor 45a will run in the opposite direction, that is, in the direction opposites to that indicated by its arrow.

The operation of the embodiment of Fig. 3, as thus far considered, is substantially similar to that of Fig. 2 except that the combustion chambers 19 and 20 are provided. Chamber 20 is provided with a pipe or injector 21 having a valve 22 for supplying fuel and additional air if found necessary to the chamber 20. The fuel used in the several combustion chambers of the embodiments of Figs. 3 and 4 will usually be fuel oil. The valve 22 is open when the turbine 2" is rotating the propeller, but is closed when turbine 2" is idling.

This embodiment of Fig. 3 further includes a two-stage rotary air compressor which, for convenience, is shown as separate compressors 23 and 24, the compressor 23 being the first-stage compressor and the compressor 24 being the second-stage compressor. The compressors are connected by a shaft 25 and compressor 24 is connected to shaft 15" so that both compressors will be rotated by the turbine 3". Each compressor has an inlet and an outlet.

A duct 26 leads to the inlet of compressor 23 for supplying the compressor with air. A duct 27 leads from the outlet of compressor 23, and a duct 28 leads to the inlet of compressor 24. These ducts 27, 28 are connected by a duct 29, later to be referred to. Thus the compressed air coming from the first-stage compressor 23 is supplied to the second-stage compressor 24. A duct 30 extends from the outlet of compressor 24, and a duct 31 extends to the inlet of combustion chamber 19. These ducts 30, 31 are connected by a duct 32, later to be referred to. Thus the compressed air coming from the second-stage compressor 24 is supplied to the combustion chamber 19.

The two-stage air compressor and its associated ducts as thus far described, may be considered as another unit which has its compressors connected to the combustion chamber 19 and to the turbine 3" of the first mentioned unit respectively by the duct 31 and shaft 15" as aforesaid. Fuel is supplied to this second unit at any suitable place, preferably by the pipe or injector 33 connected directly with the chamber 19.

A cooler and a heater are shown in this embodiment although they may be dispensed with, if desired. The cooler is diagrammatically indicated at 34. A cooling element is indicated at 35 for the cooling medium, which may be water which flows through the element as indicated by the arrows. While the ducts 27 and 28 have been described as being connected by the duct 29, this duct 29, when the cooler 34 is employed, will constitute the other element of the cooler 34 for conveying and cooling the fluid passing from duct 27 to duct 28.

The heater is diagrammatically indicated at 36. The heating element is indicated at 37 and at its inlet end connects with the pipes 6" and 18'. It thus receives the hot exhaust from the turbine 2" when it is rotating the propeller 1" at which time the pipe 18' is closed by the valve 17'. When the turbine 2" is idling the element 37 receives the hot exhaust from the turbine 3", the pipe 18' then being opened by the valve 17' and the fuel supplied to chamber 20 being shut off by valve 22. As similarly stated regarding duct 29, duct 32, when the heater 36 is employed, will constitute the other element of the heater for conveying and heating the fluid passing from duct 30 to duct 31.

Referring to the embodiment of Fig. 4, the power plant comprises a turbine unit substantially similar to the unit first described in the embodiment of Fig. 3, and will presently be described more in detail. The second or compressor unit of this embodiment is however somewhat different from that of Fig. 3. It comprises the two-stage air compressor but the two compressors 23', 24' are not mechanically connected for being rotated as in Fig. 3. A third turbine 38 is employed which receives the compressed air from the two-stage air compressor, as will later more fully appear. A duct 39 connects the outlet of turbine 38 with the inlet of combustion chamber 19' for conveying thereto exhaust gas from turbine 38, as will later more fully appear. In this embodiment the fuel supply and air if found necessary for chamber 19' should enter either the duct 39 or the chamber 19', but preferably the chamber 19' as shown by the pipe or injector 33'.

Either one of the air compressors 23', 24' may be connected to the turbine 3''' and the other to the turbine 38, but in the present embodiment the first-stage compressor 23' is connected to turbine 38 by shaft 40 to be driven thereby, and the second-stage compressor 24' is connected to the shaft 15''' to be driven by the turbine 3'''. Otherwise the compressors and their associated parts of the embodiments of Figs. 3 and 4 are similar and no further description is deemed necessary.

A heater is employed similar to that of the embodiment of Fig. 3 except that its element 32' is not connected to the combustion chamber 19' as in the embodiment of Fig. 3. A third combustion chamber 41 is provided for adding heat and products of combustion to the power gas for the turbine 38, and element 32' is connected to duct 31' for conveying and heating the fluid passing from duct 30' to duct 31', and therefrom to the inlet of chamber 41. The outlet of chamber 41 is connected by a duct 42 to the inlet of turbine 38 for conveying the hot gases to turbine 38. The fuel supply for the chamber 41 may be at any suitable location between and including the duct 26' and chamber 41, but it is preferably, as shown, supplied directly to the chamber 41 by the pipe or injector 43.

While Fig. 4 is diagrammatic, the stationary and rotary parts of the turbines 2''' and 3'''' are indicated and the control valve for the turbine 2''' is shown in cross section so that the reversing of the power plant can be more clearly understood. Turbine 2''' has stationary blades 44 directing the gas entering the turbine from duct 4''' in a proper manner so that it will rotate the turbine rotor 45 in the proper direction for driving the propeller 1''' in a forward direction when gas is flowing through the duct 4'''. Turbine 3''' has stationary blades 46 directed oppositely from the stationary blades 44 of turbine 2''', and the rotor 47 of turbine 3''' has blades which are oppositely directed from the blades of rotor 45 so that gas entering turbine 3''' from duct 7''' rotates rotor 47 in the opposite direction from rotation of rotor 45 when rotor 45 is being driven by its gas. The direction of rotation of rotor 47 is always the same and is indicated by an arrow. In Fig. 4, the clutch device 14''' is shown closed. In other words propeller 1''' and turbine 2''' are being driven by turbine 3'''. Thus at this time rotor 45 will be rotating in the direction indicated by the arrow, that is, in the same direction as rotor 47. Thus turbine 2''' will not be provided with any gas and duct 4''' will be closed by valve 17'' as indicated in Fig. 4, valve 17'' connecting pipe 8''' with the pipe 6'''. Combustion chamber 20' will be inoperative since its supply of fuel will be closed off by valve 22'.

The propeller 1''' as aforesaid will be running in reverse when the power plant is adjusted as shown in Fig. 4. If it is desired to drive the propeller 1''' in a forward direction, then clutch 14''' will be opened by means of its lever 14c, valve 17'' will be turned to connect ducts 8''' and 4''', and valve 22' will be opened to supply fuel to the combustion chamber 20'. Rotor 47 will then run in the same direction, that is, in the direction of the arrow shown, but rotor 45 will run in the opposite direction, that is, in the direction opposite to that indicated by its arrow.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A power plant comprising two rotary engines, each of said engines having an exhaust outlet and a supply inlet for power fluid, said engines rotating in opposite directions when each is supplied with power fluid, said supply inlet of one of said engines having controllable means adapted to be opened and closed for respectively supplying and cutting off its said fluid; a power plant main load for said one engine; a load for the other of said engines; and a clutch for coupling and uncoupling said engines, said engines, when uncoupled and when said inlet controllable means of said one engine is open, rotating in said opposite directions, and, when said engines are coupled and said inlet controllable means of said one engine is closed, said other engine rotating in its said direction and reversing the direction of rotation of said one engine and its said load.

2. A power plant comprising two rotary engines, each of said engines having an exhaust outlet and a supply inlet for power fluid for said engines rotating in opposite directions when each is supplied with power fluid, said supply inlet of one of said engines having an inlet conduit, and said exhaust outlet of the other of said engines having an exhaust conduit; a power plant main load for said one engine; a load for said other engine; a valve connecting said conduits and having a port openable to said exhaust conduit, said valve being adapted to open said inlet conduit to said exhaust conduit with simultaneous closing of said port for supply of exhaust from said other engine as power fluid for said one engine and further being adapted to close said inlet conduit from said exhaust conduit with simultaneous opening of said port to said exhaust conduit for exhaust of said other engine through said port; and a clutch for coupling and uncoupling said engines, said engines, when uncoupled and when said inlet conduit is open for said fluid supply, rotating in said opposite directions and, when said engines are coupled and said inlet conduit is closed from said fluid supply, said other engine rotating in its said direction and reversing the direction of rotation of said one engine and its said load.

3. A power plant comprising two gas turbines, each of said turbines having an exhaust outlet and a supply inlet for gas, said turbines rotating in opposite directions when each is supplied with gas, said supply inlet of one of said turbines having an inlet conduit, and said exhaust outlet of the other of said turbines having an exhaust conduit, one of said conduits having a combustion chamber provided with controllable means for supplying fuel thereto; a valve connecting said conduits and having a port openable to said exhaust conduit, said valve being adapted to open said inlet conduit to said exhaust conduit with simultaneous closing of said port for supply of exhaust from said other turbine as power fluid for said one turbine and further being adapted to close said inlet conduit from said exhaust conduit with simultaneous opening of said port to said exhaust conduit for exhaust of said other turbine through said port; a power plant main load for said one turbine; an air compressor providing a load for said other turbine and having an inlet, an outlet, and a conduit connecting its said outlet with said other turbine inlet, said compressor conduit having a combustion chamber provided with means for supplying fuel thereto; and a clutch for coupling and uncoupling said turbines, said turbines, when uncoupled and when said one turbine inlet conduit is open for said gas supply, rotating in said opposite directions, and, when said turbines are coupled and said one turbine inlet conduit is closed from gas supply, said other turbine rotating in its said direction and reversing the direction of rotation of said one turbine and said main load.

4. A power plant comprising two gas turbines, each of said turbines having an exhaust outlet and a supply inlet for gas, said turbines rotating in opposite directions when each is supplied with gas, said supply inlet of one of said turbines having an inlet conduit, and said exhaust outlet of the other of said turbines having an exhaust conduit, one of said conduits having a combustion chamber provided with controllable means for supplying fuel thereto; a valve connecting said conduits and having a port openable to said exhaust conduit, said valve being adapted to open said inlet conduit to said exhaust conduit with simultaneous closing of said port for supply of exhaust from said other turbine as power fluid for said one turbine and further being adapted to close said inlet conduit from said exhaust conduit with simultaneous opening of said port to said exhaust conduit for exhaust of said other turbine through said port; a further turbine having an exhaust outlet and a supply inlet for gas for rotation of said further turbine in one direction only, and a conduit connecting said further turbine exhaust outlet with said other turbine inlet, said further turbine conduit having a combustion chamber provided with means for supplying fuel thereto; a power plant main load for said one turbine; first and second stage air compressors, one providing a load for said other turbine and the other providing a load for said further turbine, each of said compressors having an inlet and an outlet, said compressors having a conduit connecting said first stage compressor outlet with said second stage compressor inlet, said second stage compressor having a conduit connecting its said outlet with said further turbine supply inlet, said last mentioned conduit having a combustion chamber provided with means for supplying fuel thereto; and a clutch for coupling and uncoupling said one turbine and said other turbine, said one turbine and said other turbine, when uncoupled and when said one turbine inlet conduit is open for its said gas supply, rotating in said opposite directions, and, when said one turbine and said other turbine are coupled and said one turbine inlet conduit is closed from gas supply, said other turbine rotating in its said direction and reversing the direction of rotation of said one turbine and said main load.

5. A power plant comprising two gas turbines, each of said turbines having an exhaust outlet and a supply inlet for gas, said turbines rotating in opposite directions when each is supplied with gas, said supply inlet of one of said turbines having an inlet conduit, and said exhaust outlet of the other of said turbines having an exhaust conduit, one of said conduits having a combustion chamber provided with controllable means for supplying fuel thereto; a heater connected to said one turbine outlet for receiving hot gas therefrom; a valve connecting said conduits and having a port openable to said exhaust conduit, said valve being adapted to open said inlet conduit to said exhaust conduit with simultaneous closing of said port for supply of exhaust from said other turbine as power fluid for said one turbine and further being adapted to close said inlet conduit from said exhaust conduit with simultaneous opening of said port to said exhaust conduit for exhaust of said other turbine through said port; a power plant main load for said one turbine; first and second stage air compressors, at least one providing a load for said other turbine, each of said compressors having an inlet and an outlet, said compressors having a conduit connecting said first stage compressor outlet with said second stage compressor inlet; a cooler for cooling said compressor connecting conduit, said second stage compressor having delivery means connecting its said outlet with said other turbine supply inlet and passing through said heater for being heated thereby, said delivery means having a combustion chamber, adjacent said other turbine supply inlet, provided with means for supplying fuel thereto; and a clutch for coupling and uncoupling said turbines, said turbines, when uncoupled and when said one turbine inlet conduit is open for said gas supply, rotating in said opposite directions, and, when said turbines are coupled and said one turbine inlet conduit is closed from gas supply, said other turbine rotating in its said direction and reversing the direction of rotation of said one turbine and said main load.

ROBERT T. SAWYER.

REFERENCES CITED

The following references are of record in the file of this patent:

UNITED STATES PATENTS

| Number | Name | Date |
|---|---|---|
| 752,545 | Goede | Feb. 16, 1904 |
| 868,943 | Robinson | Oct. 22, 1907 |
| 871,030 | Burger | Nov. 12, 1907 |
| 2,216,494 | Kurtz | Oct. 1, 1940 |

FOREIGN PATENTS

| Number | Country | Date |
|---|---|---|
| 212,104 | Switzerland | Oct. 31, 1940 |